F. HAMILTON.
SPECTACLES.
APPLICATION FILED FEB. 5, 1912.
1,044,518.
Patented Nov. 19, 1912.
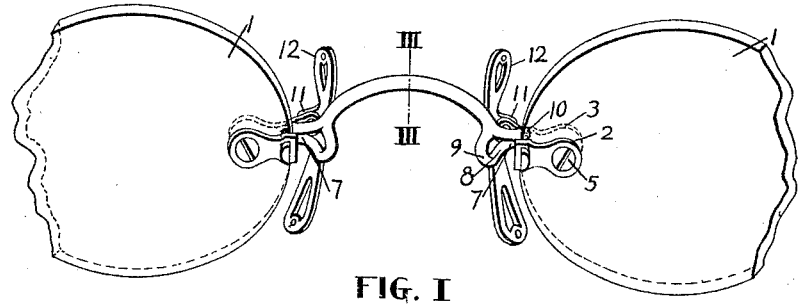
FIG. I
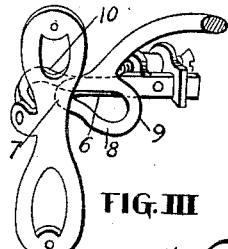
FIG. III
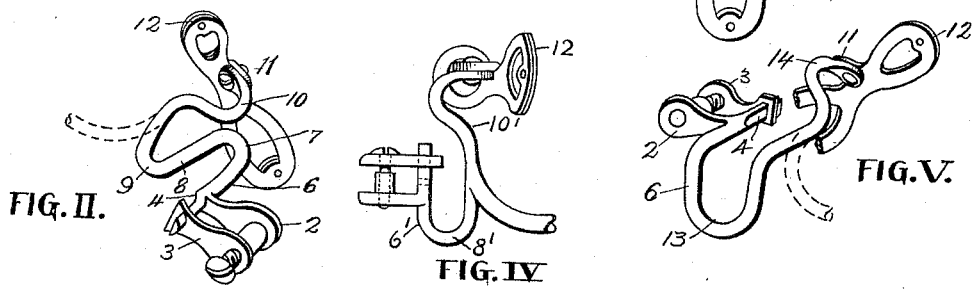
FIG. II.  FIG. IV  FIG. V.
WITNESSES:
Joseph J. Demers
Reginald H. Waters
INVENTOR
FREDERICK HAMILTON
By H. H. Styles & H. H. Parsons
ATTORNEYS

UNITED STATES PATENT OFFICE.

FREDERICK HAMILTON, OF PROVIDENCE, RHODE ISLAND.

SPECTACLES.

1,044,518.

Specification of Letters Patent.    Patented Nov. 19, 1912.

Application filed February 5, 1912. Serial No. 675,599.

*To all whom it may concern:*

Be it known that I, FREDERICK HAMILTON, a citizen of the United States, residing at Providence, in the county of Providence and State of Rhode Island, have invented certain new and useful Improvements in Spectacles, of which the following is a specification.

My invention relates to improvements in spectacles, and has particular reference to an improved form of mounting for spectacle lenses. It, however, is also applicable to eyeglasses and other forms of nose-engaging appliances.

The object of my invention is the provision of an improved mounting which will permit of adjustment of the nose bearing portion of the mounting and of adjustment of the crest angle, the pupillary distance and the inset or outset of the lenses as desired.

The further object of my invention is the provision of an inexpensive and readily constructed mounting which will permit of universal relative adjustment of the various essential parts composing said mounting.

Other objects and advantages of my improved mounting will be readily apparent by reference to the following specification taken in connection with the appended drawings forming a part thereof, and it will be understood that I may make any modifications in the specific details of construction shown and described within the scope of the appended claims without departing from or exceeding the spirit of my invention.

Figure I represents a fragmentary front view of a pair of spectacles including my improved mounting. Fig. II represents a fragmentary perspective view of that form of mounting shown in Fig. I. Fig. III represents a view slightly in perspective of the mounting, the bridge being cut on the line III—III of Fig. I. Fig. IV represents a plan view of a modified construction of my invention. Fig. V represents a fragmentary perspective view of another modification of my invention.

In the drawings the numeral 1 designates the lenses, each of which is engaged by the ears 2 and 3 of the lens clip, the ear 3 being adjustable on the terminal end 4 of the lens support, a lens screw 5 holding the ears in engagement with the lens.

In Figs. I, II and III I have illustrated one form of my invention in which the lens support 4 is formed of round material and extends first rearward in the portion 6, then has the loop 7 formed therein extending forward in the portion 8, while the portion 8 terminates in a loop 9, the material extending reversely in a J shape portion 10, while pivoted to the terminus of said portion 10 is the ear 11 of the guard member 12. It will be understood, however, that any form of either fixed or pivoted guard may be carried by the portion 10, that shown being a conventional type.

In Fig. IV I have illustrated a plan view of the simplest form of my invention which comprises merely the portion 6' and the loop 8' terminating in the J shape portion 10' bearing the guard 12.

In Fig. V I have illustrated another modification of my invention particularly adapted for attaining inset or outset adjustment of the lenses, this form of invention comprising the portion 6" corresponding to the portion 6 in Fig. II the portion 6'", however, terminating in the vertical U portion 13 which has at its other end the arm 14 bearing the guard 12.

From the foregoing description taken in connection with the accompanying drawings the construction of my improved mounting should be readily understood, and it will be seen that attached to each lens is a piece of round material having loops therein to permit of universal adjustment of the lens and the guard relative to each other. To connect the lens supports on each side I employ an ordinary bridge portion 15 which may be secured to the looped ductile lens supporting member at any desired point intermediate the lens engaging ears and the guard, the bridge or connecting portion, however being preferably secured to the J shaped arm 10. It will thus be seen that bending of said J shaped arm will serve to universally adjust the guard, while bending at the various loops or crosswise of the material of any of the arms of the lens support will permit of regulation of the crest angle relative to the lenses of the pupillary distance, or of the inset or outset of the lenses, and it will be consequently seen that I have provided a device which satisfactorily fulfils all the purposes of my invention.

I have described my invention as applied to spectacles, but it is also applicable to eyeglasses and other types of nose-fitting visual appliances where provision is made for engaging and disengaging the guards with and from the nose.

I claim:

1. A spectacle mounting, comprising an S-shaped piece of material having a lens clip secured to one end thereof, a nose guard secured to the opposite end thereof, and a bridge secured thereto intermediate the loops of the S.

2. In a spectacle mounting, the combination with a rigid bridge adapted to conform to and rest on or adjacent the nose of the wearer, of a looped member extending from one side of the bridge and having a nose guard secured to the free end thereof, and a second looped member extending from the opposite side of the bridge and having a lens clip secured to its free end.

3. A spectacle mounting comprising a rigid bridge and a pliable piece of material intermediately secured to the end of the rigid bridge and formed into a loop at each side of the bridge, one of said loops bearing a lens clip and the other bearing a nose guard.

4. A spectacle or eyeglass mounting including a pliable bar of circular shape in cross section, a lens clip and a guard secured to said bar and adjustable relative to each other by bending of the bar, and a bridge secured to the bar intermediate said parts, whereby either of said parts may be adjusted relative to the bridge by bending of the bar.

5. In a spectacle mounting, a relatively rigid bridge shaped to conform to the nose of the wearer and be disposed in engagement therewith or in close proximity thereto, and a relatively pliable bar secured at each end of the rigid bridge portion, a lens clip and a guard carried by said pliable bar, and loops formed in said pliable bar intermediate the clip and the bridge and intermediate the guard and the bridge whereby both the clip and the guard may be independently adjusted relative to the bridge by bending of the pliable bar.

6. The combination with a bridge adapted to fit the nose of the wearer, of a pair of branches extending in opposite directions from each end of the bridge and having adjustment loops formed therein, a guard carried by one of said branches, and a lens supported by the other of said branches.

In testimony whereof I affix my signature in presence of two witnesses.

FREDERICK HAMILTON.

Witnesses:
VIOLA FOLLIS,
MARY X. MURPHY.